United States Patent [19]
Okada et al.

[11] 3,850,406
[45] Nov. 26, 1974

[54] DOUBLE SEALING VALVE

[75] Inventors: Katsuto Okada; Shoichi Yamanami; Akichika Ishibashi; Hirotaka Watanabe, all of Tokyo, Japan

[73] Assignee: Morinaga Milk Industry Co., Ltd., Tokyo, Japan

[22] Filed: July 23, 1973

[21] Appl. No.: 381,776

[30] Foreign Application Priority Data

Aug. 3, 1972  Japan.............................. 47-91543

[52] U.S. Cl. ............................................. 251/210
[51] Int. Cl. ............................................. F16k 1/06
[58] Field of Search .................................. 251/210

[56] References Cited
UNITED STATES PATENTS

| | | | |
|---|---|---|---|
| 1,613,293 | 1/1927 | Reif et al. | 251/210 |
| 1,951,037 | 3/1934 | Patterson | 251/210 |
| 2,839,265 | 6/1958 | Hobbs | 251/210 X |
| 3,521,853 | 7/1970 | Gillis et al | 251/210 X |

Primary Examiner—Henry T. Klinksiek
Attorney, Agent, or Firm—Kurt Kelman

[57] ABSTRACT

A double sealing valve is provided which prevents the passage of fluid doubly and which is particularly well suited for use in manufacturing and processing machinery or plants where food or beverage products are handled. The valve comprises a valve head or valve seal adapted to be pressed against a valve seat as is the case with an ordinary valve, and a piston mounted on a shaft for actuating the valve seal, wherein a portion of a valve body is formed into a constricted cylindrical shape so that the piston slides in contact therewith, whereby a first seal is provided by the contact between the valve seal and the valve seat and a second seal is provided by the contact between the piston and the cylindrical portion of the valve body.

3 Claims, 1 Drawing Figure

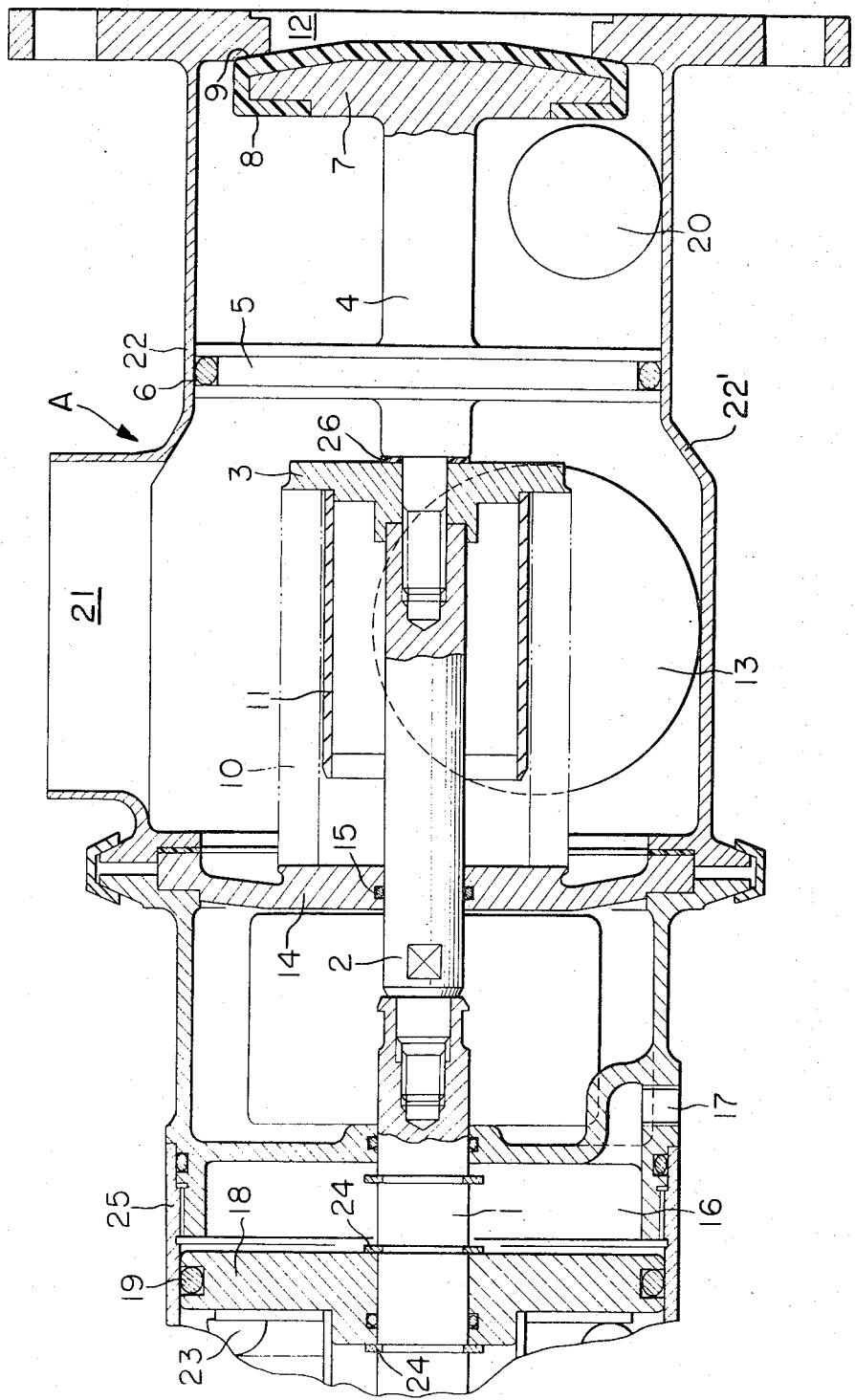

DOUBLE SEALING VALVE

BACKGROUND OF THE INVENTION

The present invention relates to valves for blocking the passage of fluid. More particularly, the present invention relates to a valve which seals hermetically at two points and which is well suited for use in machinery or plants which handle food products, particularly milk.

In a plant where milk is processed, frequent cleaning in place of the pipe line system for delivering milk is required. In such cleaning of the pipe line system in place, the pipe line system must be, without exception, sealed completely from the milk tank, for example. Otherwise, there is the danger of a solution of undesirable cleaning agent leaking into and contaminating the food product, i.e., milk and thus causing a loss that a large quantity of milk must be discarded.

Heretofore it has been customary to use a single valve at a point of connection between the pipe line system and the milk tank and the generally satisfactory results have been obtained with such a single valve. If, however, such extraneous substances as included in the raw material milk in a considerable amount attach to the valve seal or the valve seat, or if there is any defect in the valve seal or the valve seat, the valve cannot close completely thus failing to provide a satisfactory seal.

The present invention thus relates to a valve which comprises, with a view to overcoming the foregoing inadequate sealing ability of the conventional valves, a piston mounted on the valve shaft at the midpoint thereof so that this piston moves in contact with the constricted cylindrical portion of a valve body to provide an auxiliary seal thereat, whereby the valve as a whole can always block the passage of fluid without exception.

SUMMARY OF THE INVENTION

It is an object of the present invention to provide a double sealing valve in which a seal by the valve itself and another seal by its piston are provided doubly. It is a specific object of the present invention to provide a double sealing valve in which even when the valve fails to maintain a satisfactory seal, its piston provides an additional seal and consequently a positive seal is always accomplished.

It is another specific object of the present invention to provide a double sealing valve which is of a simple construction comprising a single valve shaft and two sealing members securely mounted on the valve shaft.

It is still another specific object of the present invention to provide a double sealing valve which includes an auxiliary sealing structure consisting of a piston structure into which any foreign matter can hardly enter.

It is still another specific object of the present invention to provide a double sealing valve which comprises a single valve shaft and two sealing members securely mounted on the valve shaft, whereby even when one of the sealing members fails to reach its normal position due to the presence of any foreign matter, a satisfactory seal can still be maintained by the other sealing member.

In accomplishing these objects, the valve provided in accordance with the present invention comprises a valve shaft provided with an ordinary valve seal and a piston securely mounted thereon, whereby a first seal is provided by the valve seal and the valve seat formed in a valve body and a second seal is provided by the piston and the cylindrical portion formed in a part of the valve body.

Other objects and advantages of the present invention will become readily apparent by considering the following detailed description in conjunction with the accompanying drawings.

BRIEF DESCRIPTION OF THE DRAWING

The single DRAWING is a sectional view showing a double sealing structure according to an embodiment of the present invention.

DESCRIPTION OF THE PREFERRED EMBODIMENT

In the illustrated preferred embodiment, the present invention is incorporated in a valve system wherein a raw material such as milk is delivered through a port 12 connected to a storage tank to an exit port 13 connected to a milk supply line system, or alternately milk is supplied from an inlet port 21 into the storage tank through the port 12. On the left side in the drawing, there is shown an air cylinder 16 enclosing a spring 23 for actuating a valve shaft having three fixedly connected longitudinal parts 1, 2 and 4.

A piston 18 is mounted on the valve shaft part 1 and it is securely held by left and right snap rings 24 so that the movement of the piston 18 causes the valve shaft to move rectilinearly to the right or left. The piston 18 is provided with an O-ring placed in a circumferential groove 19 and it is disposed in sliding contact with a side wall 25 of the cylinder. The valve shaft part 1 is threadedly and fixedly connected at one end thereof to the valve shaft part 2 and a bellows guide 3 is mounted on the other end of the valve shaft part 2 which is threadedly and fixedly connected to the end of the valve shaft part 4 extending through the bellows guide 3. A teflon packing 26 is inserted in the junction between the bellows guide 3 and the valve shaft part 4. A valve head 7 having a casting 8 made of Teflon or the like is integrally formed at the other end of the valve shaft part 4 and a piston 5 is also integrally formed with the valve shaft part 4 at its intermediary portion.

The piston 5 is provided with one or more O-rings placed in a circumferential groove 6 and the piston 5 is slidably engaged with a constricted cylindrical side wall 22 of the valve body A. A cover plate 14 located at the base portion of the valve shaft is connected with the valve body through a Teflon packing at the inner recessed portion of the left flange portion of the valve body. The left flange portion of the valve body is also connected with the flange portion of the air cylinder 16 by a clip ring. The cover plate 14 is provided with an O-ring placed in its opening 15 and the valve shaft slidably moves through the opening 15. One end of a bellows 10 is secured to the right end of the cover plate 14 by means of welding, for example, and the other end of the bellows 10 is welded to the bellows guide 3 mounted on the end of the valve shaft part 2 to move together with the valve shaft. In this way, the bellows 10 encloses and seals that portion of the valve shaft which is moved in and out of the valve body. Disposed inside the bellows 10 is a bellows guide 11 which prevents the vibration of the bellows 10 due to variation in the pressure of fluid or pulsation thereof.

When it is desired to open the valve so that fluid is supplied from the inlet port 21 into the tank through the port 12 or the fluid is delivered from the port 12 to the exit port 13, compressed air is supplied into the air cylinder 16 through a ventilating hole 17. This causes the piston 18 to move to the left against the biasing force of the spring 23 and the valve shaft is moved to the left along with the piston 18 by virtue of the snap rings 24. When this occurs, the valve head 7 integrally and threadedly connected to the valve shaft is separated, along with its coating 8, from the valve seat 9 and after a little while the piston 5 comes out of engagement with the constricted cylindrical side wall 22 of the valve body. When the valve is opened in this manner, the fluid supplied from the tank, for example, now enters into the valve body through the port 12 and this fluid flows to the exit port 13 connected to the supply line system after passing around the piston 5 which has by then moved through a flaring portion 22' into the expanded cylindrical side wall portion of the valve body. The portion 22' of the valve body flares away from the port 12 at such a rate that the cross-sectional area of the annular aperture between the piston 5 and the valve body increases more rapidly than the opening between the valve head 7 and the valve seat 8 during leftward movement of the valve shaft. The aperture thus having a sufficient cross-sectional area for the passage of the fluid.

In order to close the valve, the air in the air cylinder 16 is exhausted to expand the spring 23. This causes the piston 18 to move to the right and thereby to move the valve shaft. Consequently, the piston 5 comes into engagement with the constricted cylindrical side wall 22 of the valve body while the valve head 7 having the coating 8 comes into contact with the valve seat 9, thereby isolating and sealing the inside from the outside of the valve. It will thus be seen that according to the valve of this invention, the passage of fluid can be prevented doubly with the use of a single valve driving source and therefore, if any fault occurs in the valve, the passage of fluid can still be prevented positively.

In cleaning the system upon completion of the operation, the valve head 7 and the piston 5 are moved into the illustrated closing position to define a space whose inlet and outlet sides are sealed. Then, the fluid in the system is discharged through the exit port 13. Thereafter, a cleaning liquid is supplied through the inlet port 21 to clean the pipe lines outside the tank. Since the double sealing is provided on the storage tank side, even if any foreign matter enters between the valve seat 9 and the valve head 7 preventing the valve from being closed completely, no cleaning liquid is permitted to leak and thus enter into the tank. In this case, if a valve 20 exclusively used for draining purposes is provided between the piston 5 and the sealing system (7, 8, 9) in the closing position and if the drain valve is opened suitably after the completion of cleaning to examine the remaining fluid, a leak at the seal provided by the piston 5 can be detected by the presence of the cleaning liquid in the fluid. On the other hand, if the presence of fluid such as milk is detected after the fluid between the piston and the valve sealing system has been discharged, it indicates the presence of leakage at the valve head.

While, in the embodiment of the invention so far described, the valve sealing is provided at the forward end of the valve shaft and the piston seal is provided at the intermediary portion of the valve shaft, it is evident that the order of these seals may be changed with any change in the design of the required valve body.

It will thus be seen from the foregoing description that a double sealing valve provided according to the present invention is actuated by a single driving source and its manufacture and maintenance are also simple.

We claim:
1. A valve comprising:
 a. a valve body having two ports for flow of a liquid through the body in a predetermined path;
 b. an elongated valve shaft mounted in the body for longitudinal movement between a valve opening position and a valve closing position;
 c. a valve head and a piston ring mounted on the shaft for movement therewith in longitudinally spaced relationship, the valve head being axially spaced from the piston ring;
 d. a valve seat in the body bounding a first portion of the path,
  1. the body having a constricted wall portion bounding a second portion of the path;
 e. a drainage valve mounted in the constricted wall portion; and
 f. actuating means for moving the shaft between said positions,
  1. the valve head sealingly engaging the valve seat and the piston ring sealingly engaging the wall portion in the valve closing position of the valve shaft, the drainage valve being sealed off by the valve head and piston ring in the valve closing position.
2. A valve as set forth in claim 1, wherein the axial spacing of said valve head and of said piston ring on said shaft is such that said piston ring sealingly engages said wall portion and thereby prevents said flow before said valve head engages said valve seat.
3. A valve as set forth in claim 1, wherein the actuating means comprises an air cylinder, a piston attached to the valve shaft and dividing the air cylinder into two chambers, an air delivery and venting means in communication with one of the cylinder chambers and a spring means mounted in the other cylinder chamber and acting on the piston, the air delivery and spring means moving the shaft into a respective one of said positions.

* * * * *